United States Patent
Yates et al.

(10) Patent No.: US 12,454,372 B2
(45) Date of Patent: Oct. 28, 2025

(54) MODULAR SOLAR ARRAY

(71) Applicant: Maxar Space LLC, Palo Alto, CA (US)

(72) Inventors: Harry A. Yates, Mountain View, CA (US); Tom Hsieh, San Jose, CA (US); Ryan Bieniek, Reno, NV (US); Ben Kwong, San Mateo, CA (US); Robert Szombathy, Rocklin, CA (US); Martinus Meerman, San Martin, CA (US); Frederick Oey, San Carlos, CA (US); Peter Amnuaypayoat, San Francisco, CA (US); Alan J. Szeto, San Jose, CA (US); Richard B. Warnock, Mountain View, CA (US)

(73) Assignee: Maxar Space LLC, Palo Alto, CA (US)

( * ) Notice: Subject to any disclaimer, the term of this patent is extended or adjusted under 35 U.S.C. 154(b) by 208 days.

(21) Appl. No.: 18/501,264

(22) Filed: Nov. 3, 2023

(65) Prior Publication Data
US 2024/0059431 A1    Feb. 22, 2024

Related U.S. Application Data

(62) Division of application No. 17/948,011, filed on Sep. 19, 2022, now Pat. No. 11,845,571.
(Continued)

(51) Int. Cl.
*B64G 1/44*    (2006.01)
*B64G 1/22*    (2006.01)
(Continued)

(52) U.S. Cl.
CPC ........... *B64G 1/443* (2013.01); *B64G 1/2224* (2023.08); *B64G 1/2228* (2023.08);
(Continued)

(58) Field of Classification Search
CPC .... B64G 1/443; B64G 1/2224; B64G 1/2228; B64G 1/2229; H02S 30/10; H02S 30/20; H02S 20/30; Y02E 10/50
See application file for complete search history.

(56) References Cited

U.S. PATENT DOCUMENTS

| | | | | |
|---|---|---|---|---|
| 4,101,101 A | * | 7/1978 | Barkats | F24S 25/20 244/172.7 |
| 4,524,552 A | | 6/1985 | Hujsak | |

(Continued)

FOREIGN PATENT DOCUMENTS

CN    114614232 A    6/2022

OTHER PUBLICATIONS

Extended European Search Report dated Feb. 3, 2023, European Patent Application No. 22200117.4-1002.
(Continued)

*Primary Examiner* — Joshua D Huson
*Assistant Examiner* — Vicente Rodriguez
(74) *Attorney, Agent, or Firm* — Pearl Cohen Zedek Latzer Baratz LLP

(57) ABSTRACT

A solar array structure for a spacecraft is based on a modular approach, allowing for arrays to be designed, and designed to be modified, and manufactured in reduced time and with reduced cost. The embodiments for the solar array are formed of multiple copies of a "bay" of a multiple strings of solar array cells mounted on semi-rigid face-sheet structural elements. The bays are then placed into frame structures made of tubes connected by nodes to provide an easily scalable, configurable, and producible solar array wing structure. This allows for rapid turnaround of program specific designs and proposal iterations that is quickly adaptable to new/future PhotoVoltaic (PV) technologies and that can create uniquely shaped (i.e., not rectangular) arrays, (Continued)

allowing for mass production with simple mass producible building blocks.

16 Claims, 20 Drawing Sheets

Related U.S. Application Data

(60) Provisional application No. 63/253,465, filed on Oct. 7, 2021.

(51) Int. Cl.
   *H02S 30/10* (2014.01)
   *H02S 30/20* (2014.01)

(52) U.S. Cl.
   CPC ............ *B64G 1/2229* (2023.08); *H02S 30/10* (2014.12); *H02S 30/20* (2014.12)

(56) References Cited

U.S. PATENT DOCUMENTS

| | | | | |
|---|---|---|---|---|
| 5,319,905 | A | * | 6/1994 | Szirtes ................. B64G 1/2228 244/172.6 |
| 7,211,722 | B1 | | 5/2007 | Murphy |
| 8,974,899 | B1 | | 3/2015 | Wilt |
| 9,120,583 | B1 | | 9/2015 | Spence et al. |
| 10,112,731 | B2 | | 10/2018 | Rodrigues et al. |
| 11,047,598 | B2 | * | 6/2021 | Grant ...................... H02S 20/32 |
| 11,496,089 | B2 | * | 11/2022 | Rehder .................. H02S 30/10 |
| 2010/0163684 | A1 | * | 7/2010 | Dando ...................... E05D 1/02 244/172.6 |
| 2011/0097138 | A1 | | 4/2011 | Eikelenboom |
| 2014/0190546 | A1 | * | 7/2014 | Fukumochi ......... H10F 71/1375 438/4 |
| 2019/0305719 | A1 | | 10/2019 | Rehder |
| 2021/0347504 | A1 | * | 11/2021 | York .................... B64G 1/1085 |
| 2023/0115933 | A1 | | 4/2023 | Yates et al. |

OTHER PUBLICATIONS

English Abstract of Chinese Publication No. CN114614232 published Jun. 10, 2022.

Restriction Requirement dated Jan. 11, 2023, U.S. Appl. No. 17/948,011, filed Sep. 19, 2022.

U.S. Appl. No. 17/948,011, filed Sep. 19, 2022. Response to Restriction dated Feb. 1, 2023.

Non-final Office Action dated Jun. 9, 2023, U.S. Appl. No. 17/948,011, filed Sep. 19, 2022.

Response to Office Action dated Sep. 5, 2023, U.S. Appl. No. 17/948,011, filed Sep. 19, 2022.

Notice of Allowance dated Oct. 11, 2023, U.S. Appl. No. 17/948,011, filed Sep. 19, 2022.

* cited by examiner

MODULAR SOLAR ARRAY

CROSS-REFERENCE TO RELATED APPLICATION

This application is a divisional of U.S. patent application Ser. No. 17/948,011 filed Sep. 19, 2022, published as U.S. Publication No. 2023/0115933 on Apr. 13, 2023 and issued as U.S. Pat. No. 11,845,571 on Dec. 19, 2023, of Yates et al., entitled, "Modular Solar Array," which claims priority to the benefit of U.S. provisional patent application No. 63/253,465 filed Oct. 7, 2021, of Yates et al., entitled "Solar Array", both of which are incorporated herein by reference in their entirety.

BACKGROUND

To provide operating power, satellites use solar array structures with a large surface area of photovoltaic cells to generate electricity from the sunlight incident on the array structure. For shipment and launch the solar array is stowed to have a small volume and then deployed once the spacecraft has been launched. For launch purposes, the smaller the volume and the lower the weight, the better. Once fully deployed, it is desirable that the solar array structure provide a light weight, stiff, strong, stable, and flat surface of sufficient surface area that can allow uniform exposure to the sun and minimize on-orbit spacecraft attitude control disturbance while meeting the satellite's power requirements. These conflicting needs result in an ongoing pursuit of improvements in the design of such solar arrays.

DETAILED DESCRIPTION

The following presents techniques for providing a solar array structure for a satellite or other spacecraft based on a modular approach, allowing for arrays to be designed, and designs to be modified, and manufactured in reduced time and with reduced cost. The embodiments for the solar array are formed of multiple copies of a "bay" of a multiple strings of solar array cells mounted on semi-rigid face-sheet structural elements. The bays are then placed into a frame structure made of tubes connected by nodes to provide an easily scalable, configurable, and producible solar array wing structure. This allows for rapid turnaround of program specific designs and proposal iterations that is quickly adaptable to new/future PhotoVoltaic (PV) technologies and that can create uniquely shaped (i.e., not rectangular) arrays, allowing for mass production with simple mass producible building blocks.

Figure 1:
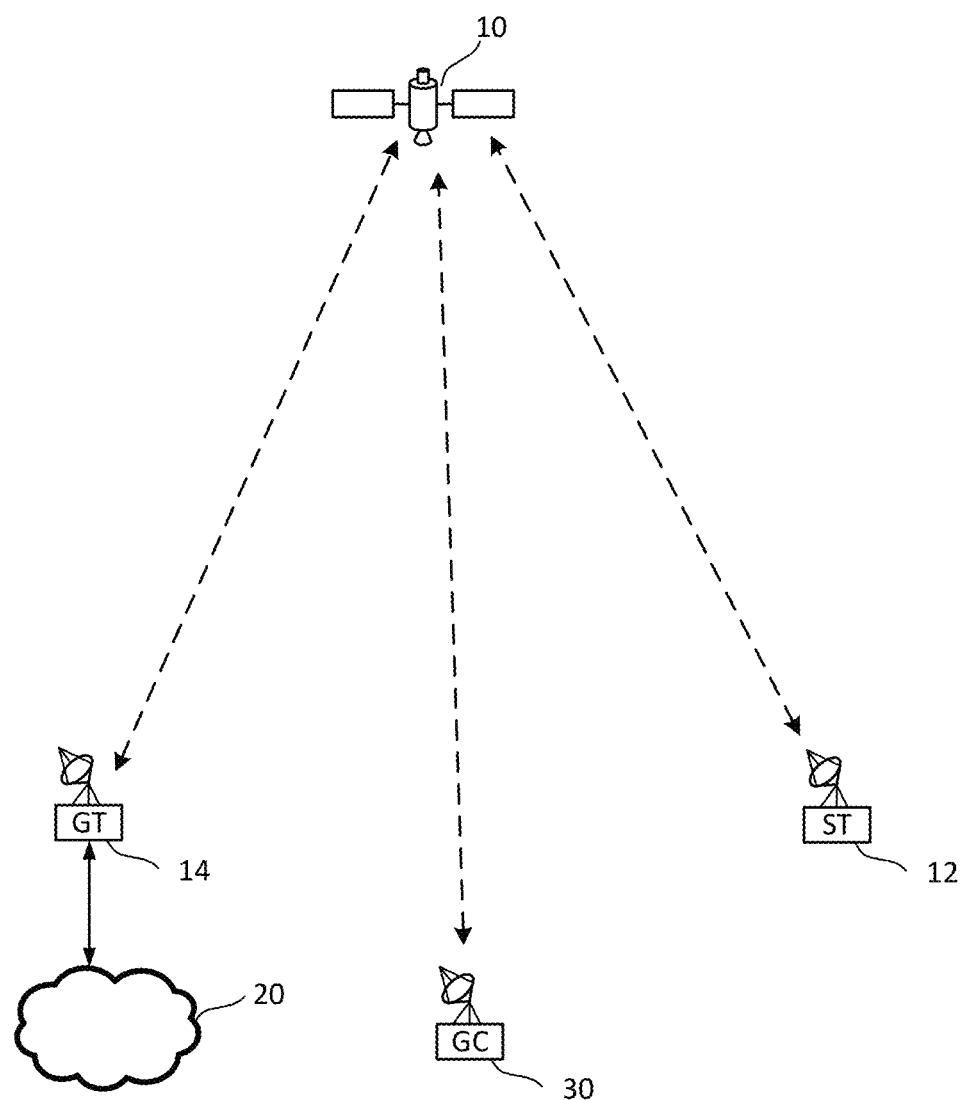
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
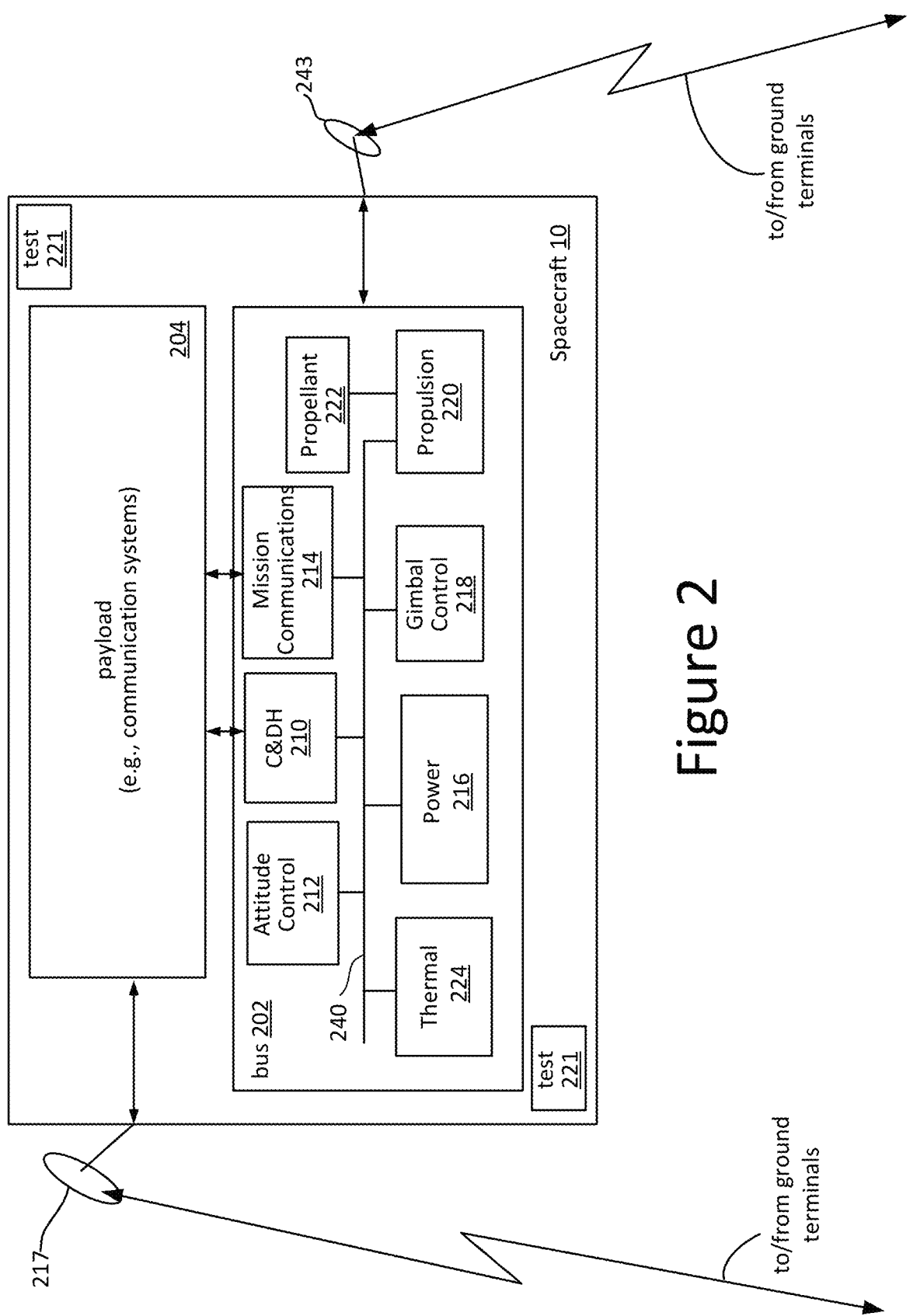
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218 that be taken to include a solar array drive assembly, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communication systems 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 3:
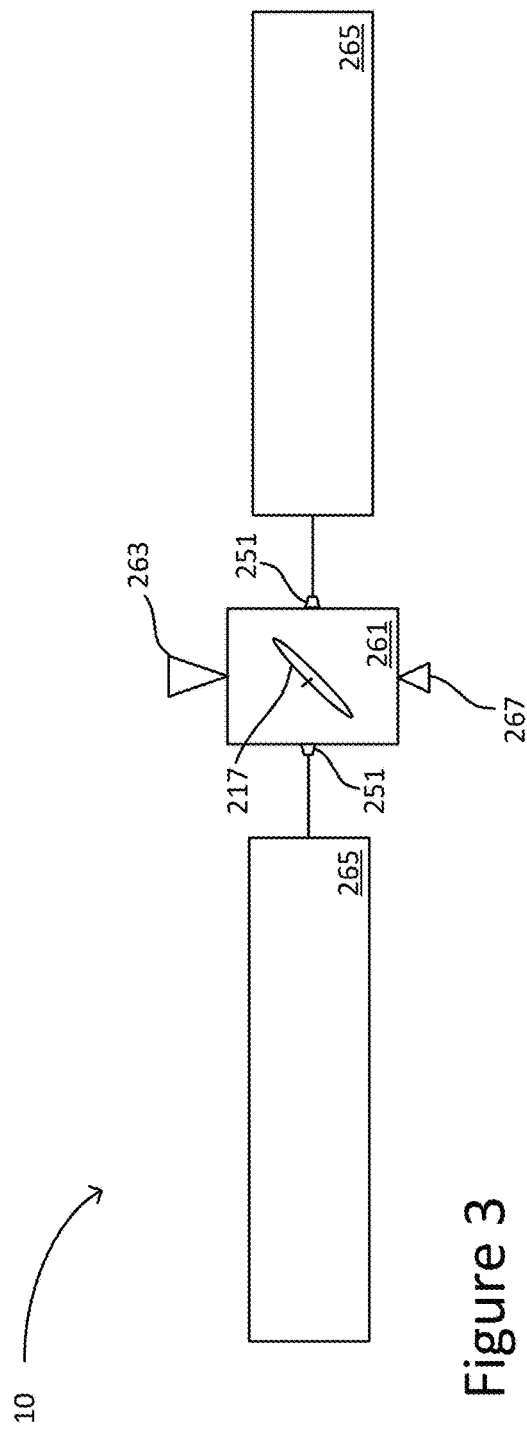
FIGS. 3 and 4 illustrate two views of a spacecraft with deployed solar arrays.
Figure 4:
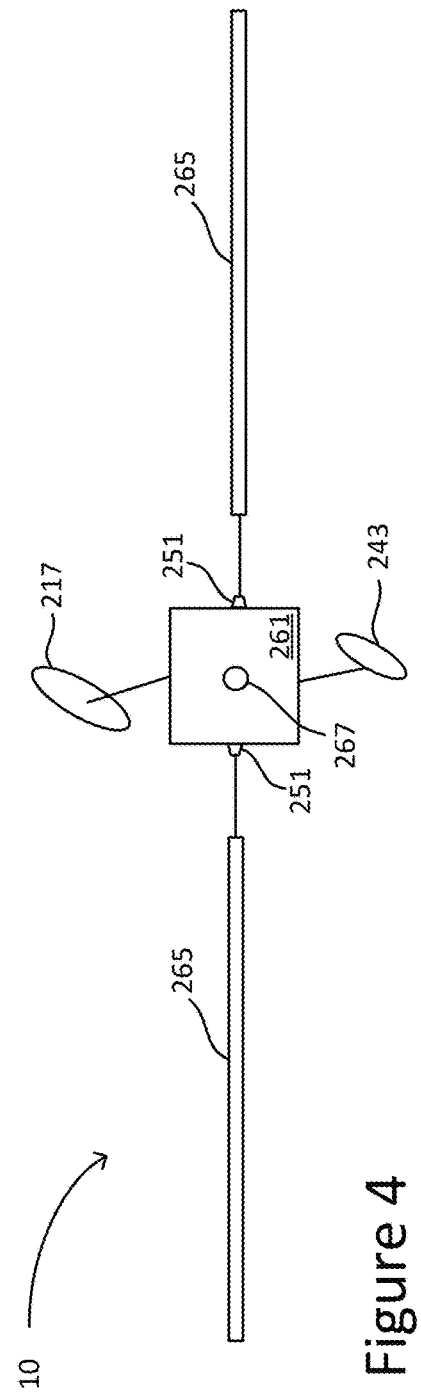

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the spacecraft body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control or solar array drive assembly 251 about the longitudinal axis (the left-right axis in FIGS. 3 and 4), in order to achieve or maintain a desired attitude with respect to, for example, the sun. For embodiments in which the deployed arrays 265 include a solar array, the solar array may be articulable so as to be substantially sun facing and electrically connected to the spacecraft 10 to provide power. The deployed solar array 265 may be sized and positioned so as to generate substantially more power from sunlight than would be possible if the solar array were fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

The solar array or arrays 265 of the spacecraft 10 have to meet a number of requirements. When in the deployed configuration, they need to be stable and meet the energy needs of the spacecraft. When in a stowed configuration, a solar array 265 needs to form a compact package that can fit within or largely within the outline of a side or sides of the body 261 of the spacecraft 10. Additionally, the mass of the array 265 should be as low as practical. As satellites and other spacecraft vary widely in shape, size, and power requirements, solar arrays are typically designed for a specific satellite or spacecraft design, so that for a different design or change in the specification of a current design requires a complete redesign of the solar array. This results in long lead times and high costs to design and build the arrays. To address these issues the following presents a modular approach to solar arrays, allowing for arrays to be designed, and for the design to be modified, and manufactured in reduced time and with reduced cost.

More specifically, embodiments for a solar array are formed of multiple copies of a "bay" formed of a multiple strings of solar array cells mounted on semi-rigid face-sheet structural elements. For example, these bays can be of around a meter square. The bays are then placed into a frame structure made of tubes connected by nodes to provide an easily scalable, configurable, and producible solar array wing structure. This allows for rapid turnaround of program specific designs and proposal iterations that are quickly adaptable to new/future PhotoVoltaic (PV) technologies and that can create uniquely shaped (i.e., not rectangular) arrays, allowing for mass production with simple mass producible building blocks.

Figure 5:
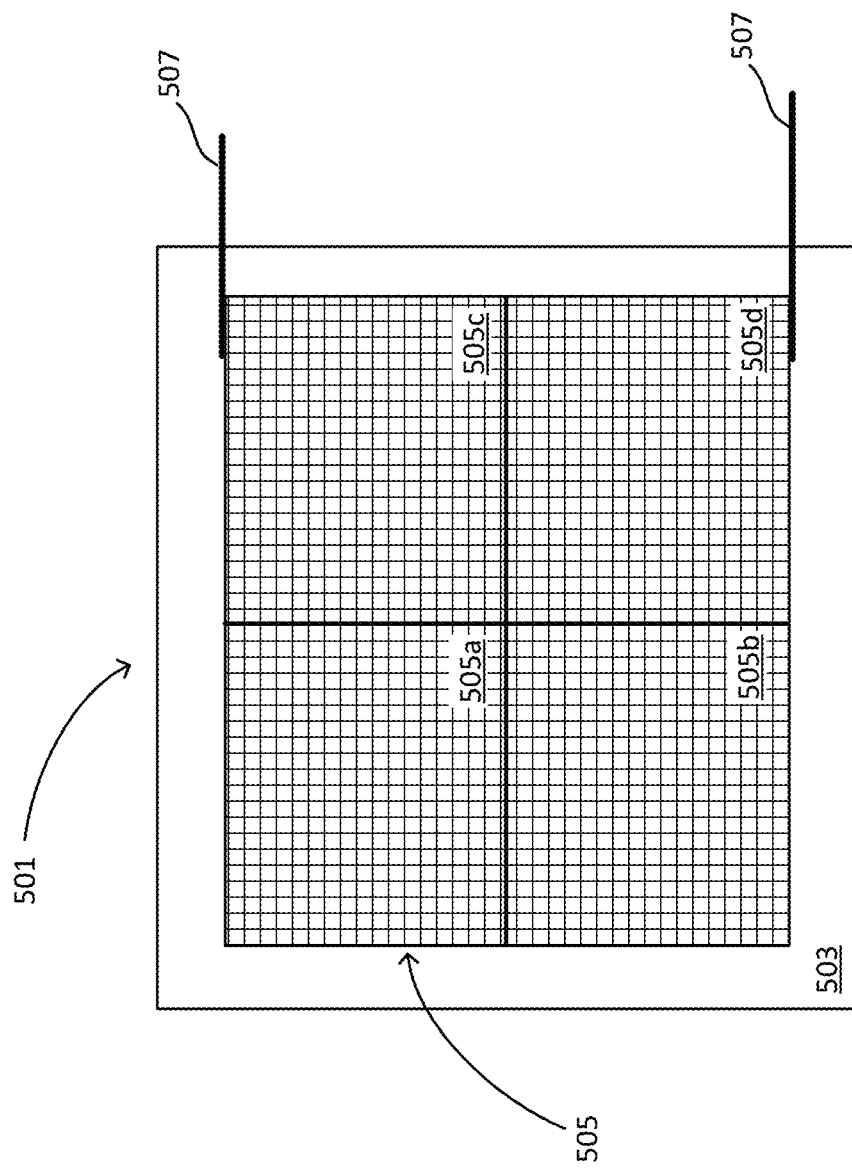
FIG. 5 illustrates an embodiment of a solar array building block element having an electrical element and a structural element.

FIG. 5 illustrates an embodiment of a solar array building block element having an electrical element and a structural element. The modular combined photovoltaic assembly (PVA) and substrate element 501, or bay, of the embodiment of FIG. 5 includes an electrical element 505 made up of four solar power modules 505a, 505b, 505c, and 505d. Each of the sub-modules 505a, 505b, 505c, and 505d can formed of a number of standardized strings of series connected photovoltaic cells, where sub-modules can be connected in pairs as discussed in more detail with respect to FIGS. 7 and 8. The electrical element 505 is mounted on a structural element 503 of a semi-rigid composite face-sheet, such as a composite laminate, such as Kevlar, or similar non-conductive material. In some embodiments the structural element 503 can be coated with a material to reduce electrostatic discharge (ESD), such as black Kapton, and material for atomic oxygen (ATOX) protection, such as CV-1144-0. In one example, the bay 501 can be ½ to 1 meter on each side and provide, for example, 120-240 watts at 30 volts, depending on the PV technology used. A set of leads 507 can connect to a wiring harness for the array.

Figure 6:
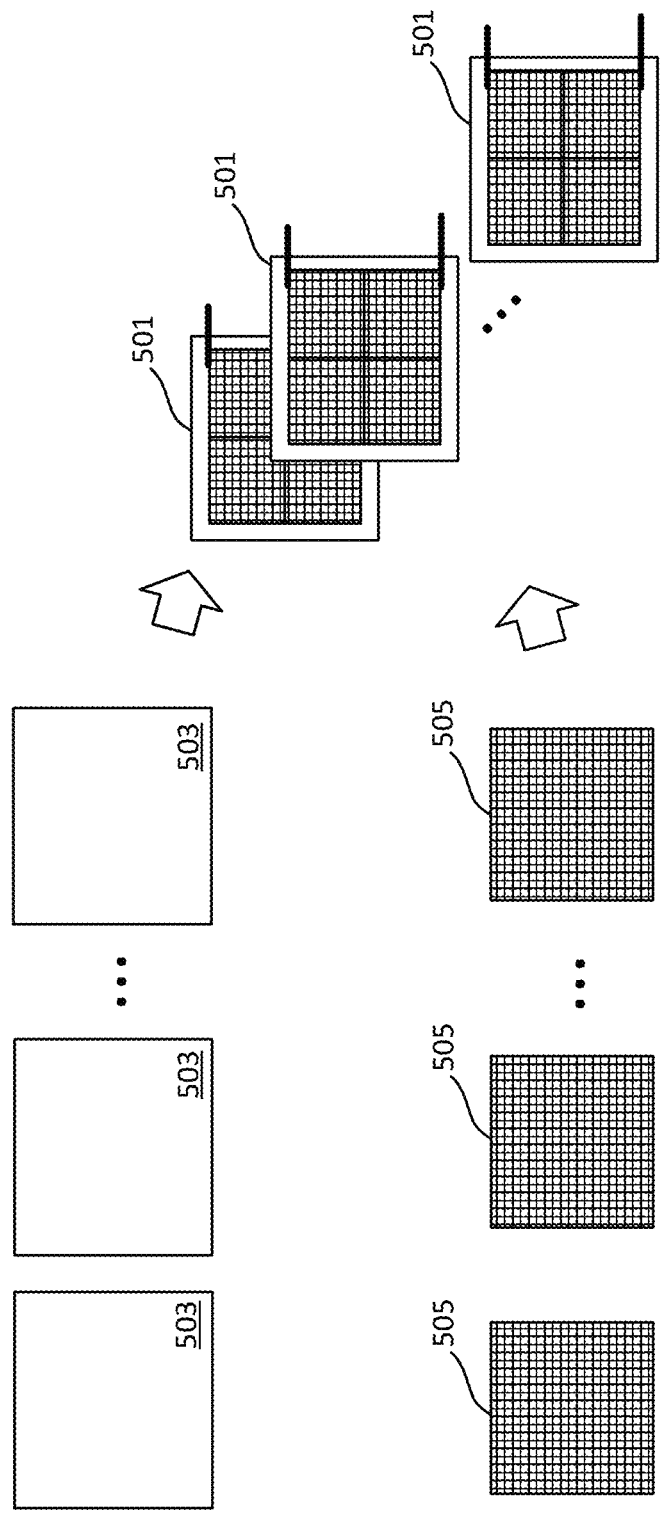
FIG. 6 illustrates the assembly of electrical elements and structural elements to form the bays.

FIG. 6 illustrates the assembly of electrical elements 505 and structural elements 503 to form the bays 501. The semi-rigid face-sheets of composite panels 503 can be Kevlar, fiberglass, Astroquarz, or similar non-conductive material. The solar power modules of the electrical component 505 can be silicon, GaAs, or other photovoltaic cells bonded onto the structural elements 503 to form composite panels 501 with flying leads.

Figure 7:
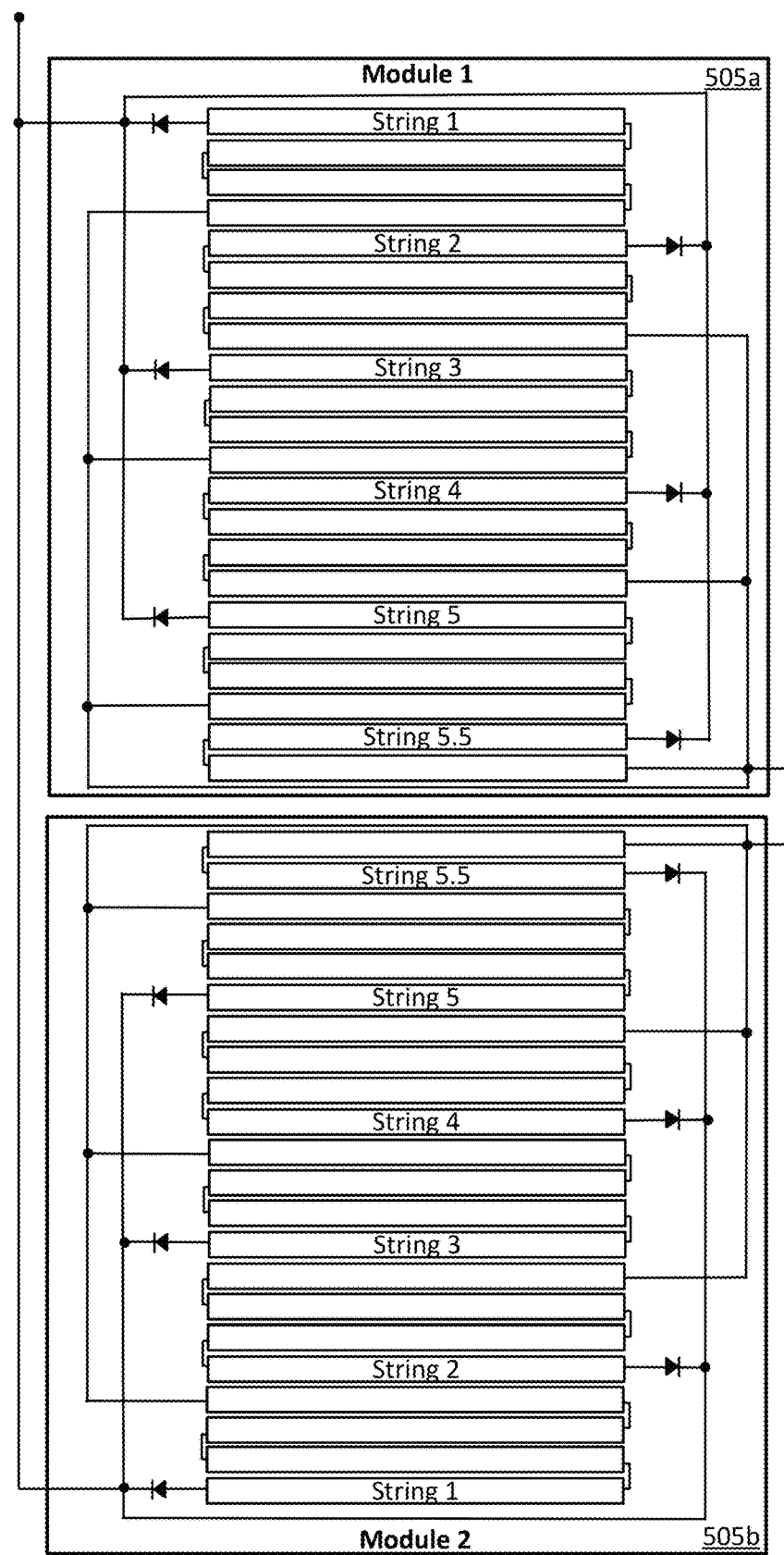
FIGS. 7 and 8 illustrate additional detail on an embodiment of the electrical element.
Figure 8:
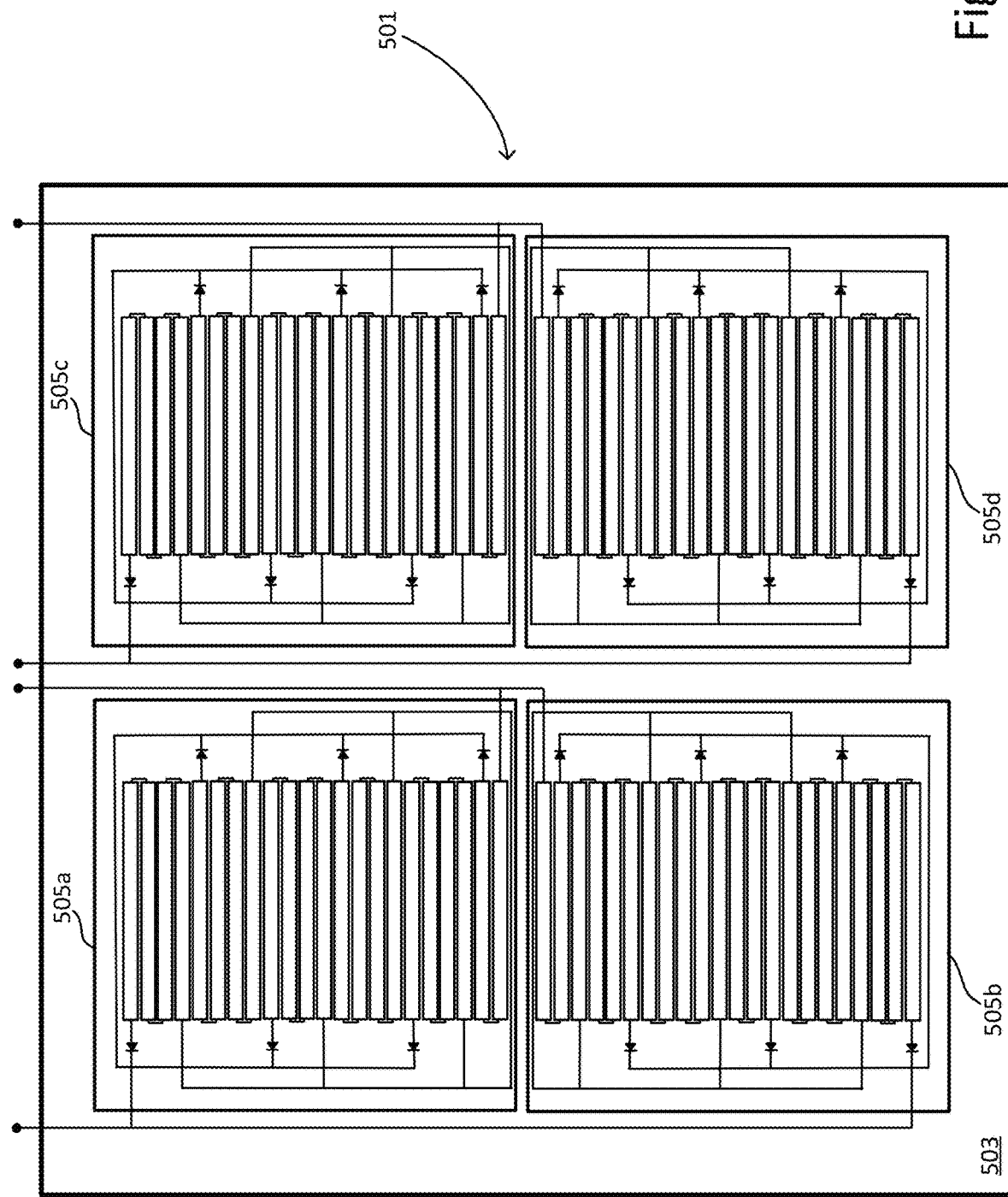

FIGS. 7 and 8 illustrate additional detail on an embodiment of the electrical element. The embodiment of FIG. 7 has two modules, Module 1 505a and Module 2 505b, connected to form one circuit. In this example, each module is formed 5.5 strings of series connected photovoltaic cells (PVCs), with each string folded to have four rows of, for example, 20 PVCs. The strings of the modules are connected in parallel between a first lead and, through a corresponding diode, a second lead to provide power. The two of the 2-module circuits are then combined and bonded onto the composite panel 503 to form the bay 501 as illustrated in FIG. 8. These individual four module bays 501 are then assembled into a full array structure on a frame and connected along a wiring harness in a wing integration process. Examples of the frame structure are described in more detail below, but FIGS. 9A, 9B, 10A, and 10B illustrate some examples of the components used to connect the multiple bays structurally and electrically 501.

Figure 9A:
FIGS. 9A and 9B illustrate some embodiments for struts from which the frame structure can be formed.
Figure 9B:
Figure 10A:
FIGS. 10A and 10B illustrate some embodiments for the wiring harness along which the bays can be connected.
Figure 10B:

FIGS. 9A and 9B illustrate some embodiments for struts from which the frame structure can be formed. These can be tubes of various length and shapes, such as a round (FIG. 9A), square (FIG. 9B), or rectangular cross section. The tubes can formed of graphite or molded carbon fiber and be connected by nodes, in a construction similar to a tubing and lug bicycle frame, to form a frame structure of a wing or panel of the solar array. In the example embodiment, the struts are strain energy struts where the tubes/struts are rigid with strain energy hinges (such as the lenticular hinges described below with respect to FIGS. 18-22), although other embodiments can use various combination of rigid and flexible structural elements, depending on how folding for stowage is effected in the embodiment. FIGS. 10A and 10B illustrate some embodiments for the wiring harness along which the leads of the individual bays can be connected. FIG. 10A illustrates a flex harness with copper traces and FIG. 10B illustrates a round wire harness. In some embodiments, the electrical harness can be integrated within the tubes.

Figure 11:
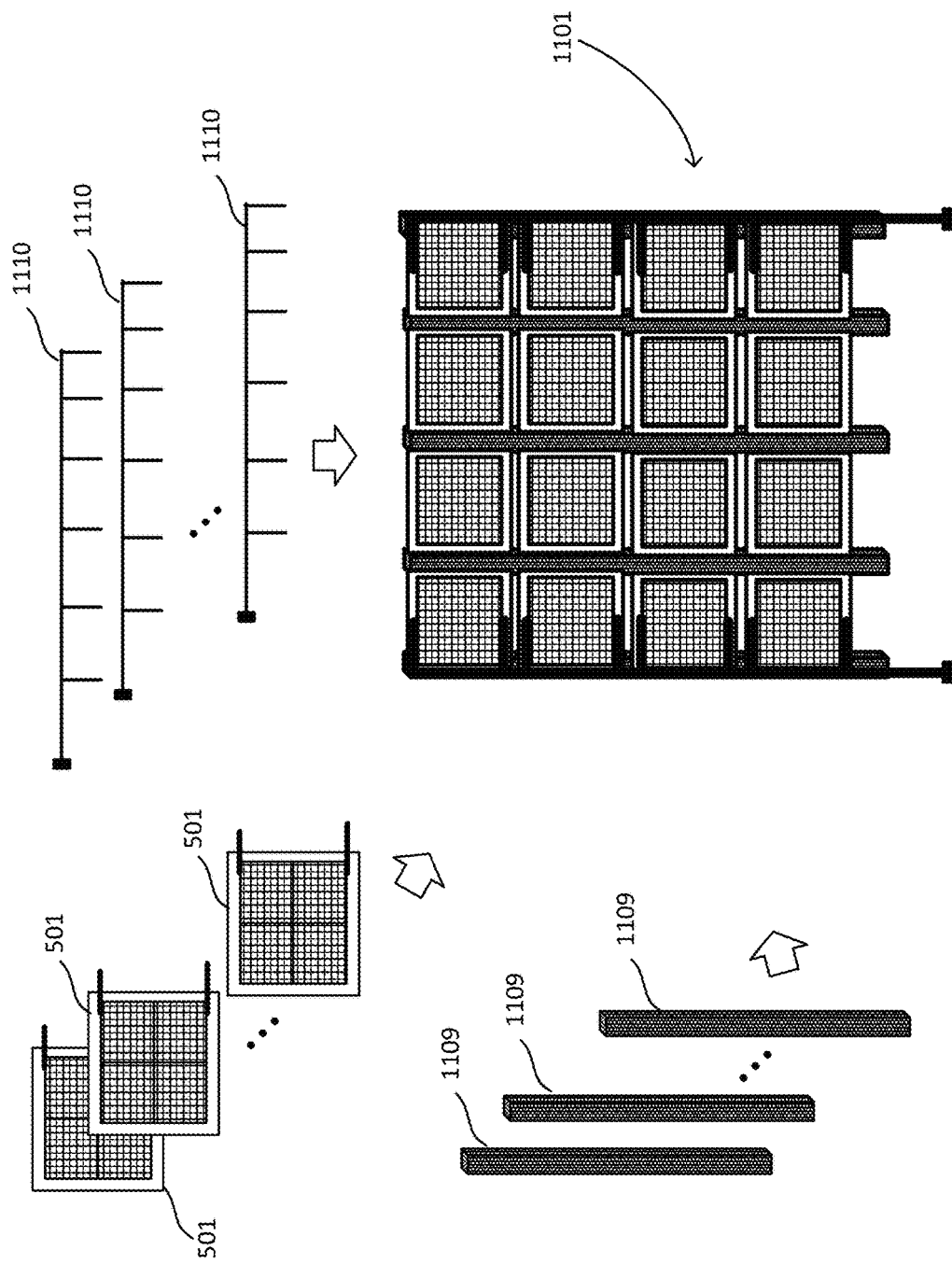
FIG. 11 illustrates the wing integration of the components into a solar array embodiment, in this case a 4×4 example.

FIG. 11 illustrates the wing integration 1101 of the components into a solar array embodiment, in this case a 4×4 example. A frame constructed of tubing 1109 held together with nodes forms a set of frames for the bays 501 that can be connected along the wiring harness 1110. The bays 501 can be mechanically connected to the frame of tubes 1109 by mechanical assemblies such as rivets or detachable connectors. For example, the tubes 1109 can graphite tubes connected by nodes of titanium or other material formed by 3D printing, injection molding, or other methods. The electrical connection of the leads of the bays 501 to the wiring harness can be done by crimps for example. The modular nature of the array 1101 allows for a wide variety of shapes and sizes to be readily constructed.

Figure 12:
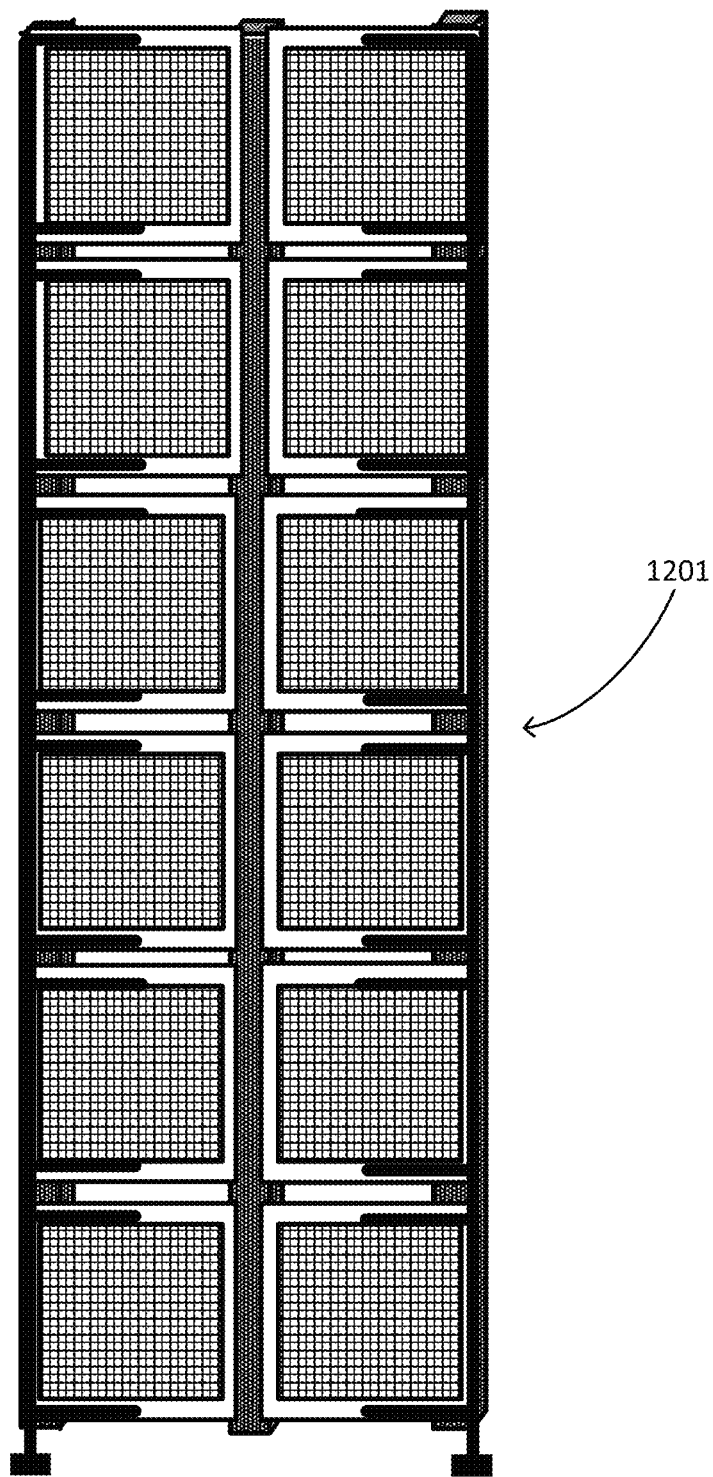
FIG. 12 and illustrate a 2×6 embodiment for a panel of a solar array made up of five such panels.
Figure 13:
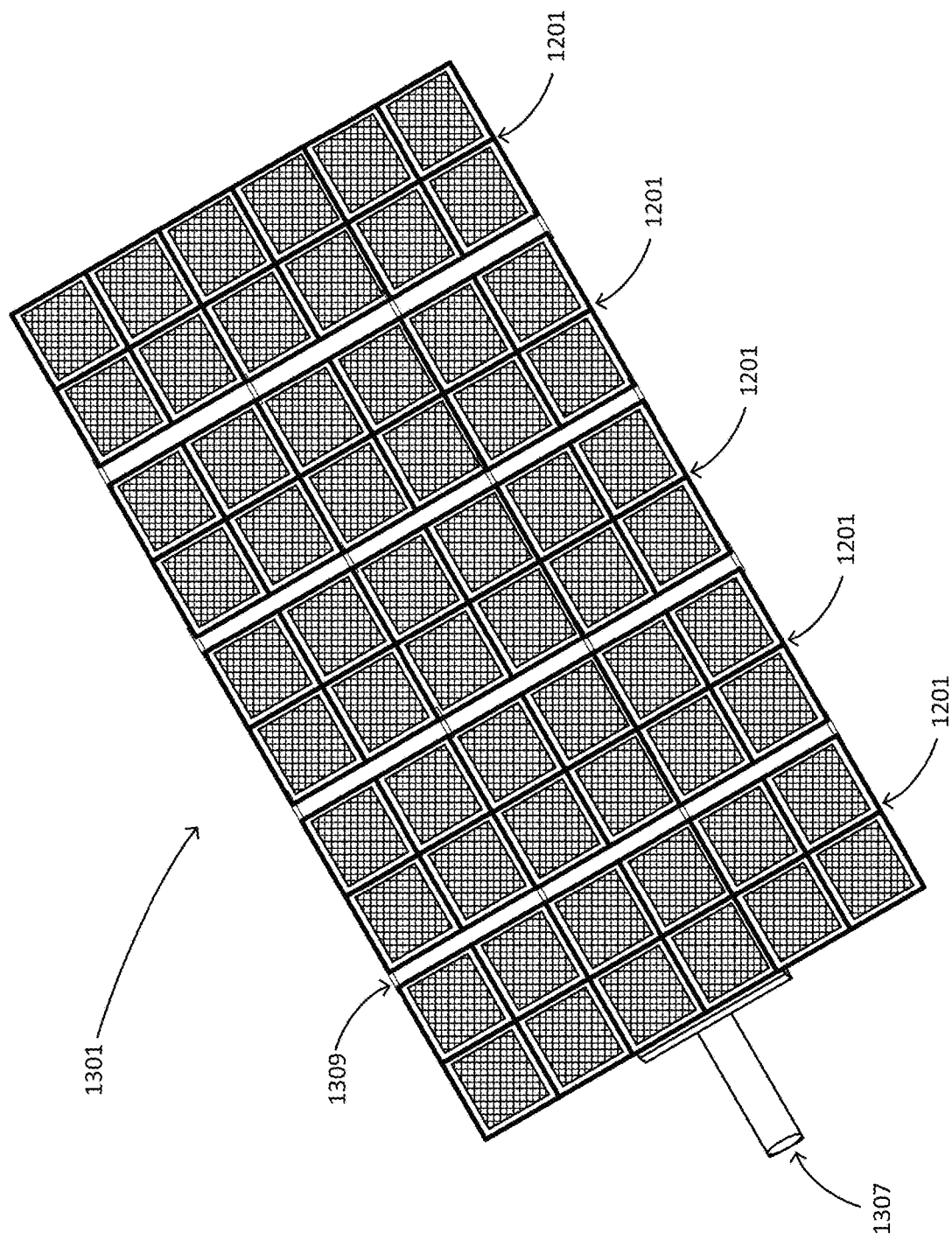

FIG. 12 and illustrate a 2×6 embodiment for a panel 1201 of a solar array 1301 made up of five such panels. The 2×6 panel 1201 can be rigid, the tubes connected by nodes, some of which include a hold-down insert for holding the array in a stowed configuration. FIG. 13 shows a solar array 1301 formed of five such panels 1201 in a deployed configuration. The panels 1201 are connected to each other by a set of hinges, such as steel lenticular spring hinges, one of which is marked out at 1309. As discussed more below, the hinges 1309 can extend the solar array 1301 from its stowed configuration when being deployed and then hold the structure extended when deployed. The wiring harness or harnesses between panels can run through the hinges in one embodiment. The panels 1201 are attached to yoke 1307, such as a foldable graphite boom, which can be attached to the spacecraft 10 at a solar array drive assembly (SADA) in the mount 251 on the spacecraft body 261. The wiring harness of the panels 1201 can the connect through the yoke to the spacecraft to provide power.

Figure 14:
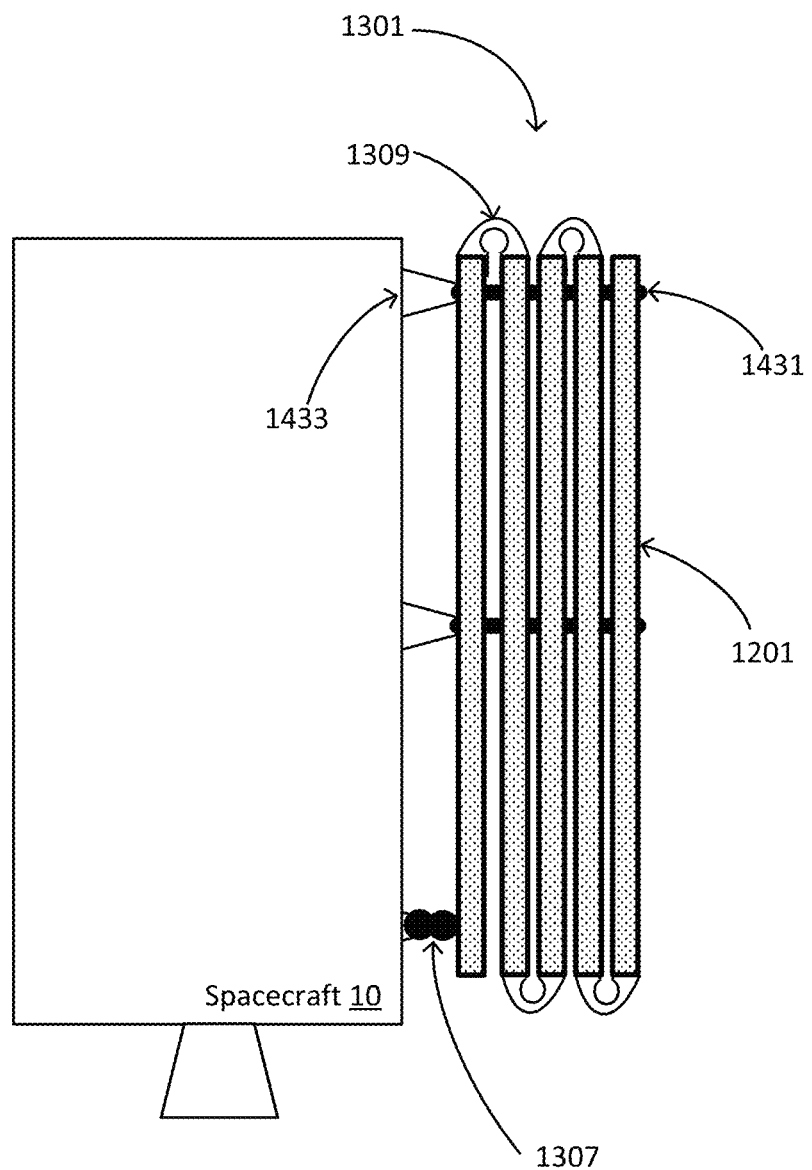
FIG. 14 illustrates an embodiment of the solar array 1301 of FIG. 13 in a stowed configuration.

FIG. 14 illustrates an embodiment of the solar array 1301 of FIG. 13 in a stowed configuration. The multi-bay panels 1201 are folded up into a stowed pack with the hinges 1309 flexed. In this embodiment, the panels 1201 are held in the stowed configuration on mounts 1433 by hold-downs 1431. Alternate embodiments can use snubbers rather than hold-downs. The yoke 1307 can fold up and attach at a solar array drive assembly on a mount 251 on the body of the spacecraft 10.

FIGS. 13 and 14 illustrate a particular embodiment, but the techniques presented here can be applied to solar arrays with different number of panels, different number of bays within the panels, and also to more general shapes than the more traditional rectangular panels. For example, in some embodiments two or more panel/frame sizes (including different shapes) can be used, allowing for more general array shapes within the modular concept presented here. The embodiments provide an easily scalable, configurable, and producible array structure based on a "picture frame" structure that can be designed by automation and mass producible building blocks (pultrusions, injection mold, etc.). This allows for a rapid turn-around of program specific designs and proposal iterations and is compatible with any size solar array and technology, being quickly adaptable to new/future photovoltaic technology uniquely shaped (i.e., non-rectangular) arrays. FIGS. 15-23 give more detail on embodiments for a solar array based on a frame structure with replaceable bays allowing for replacement of defective bays and easily adaptable structure size.

Figure 15:
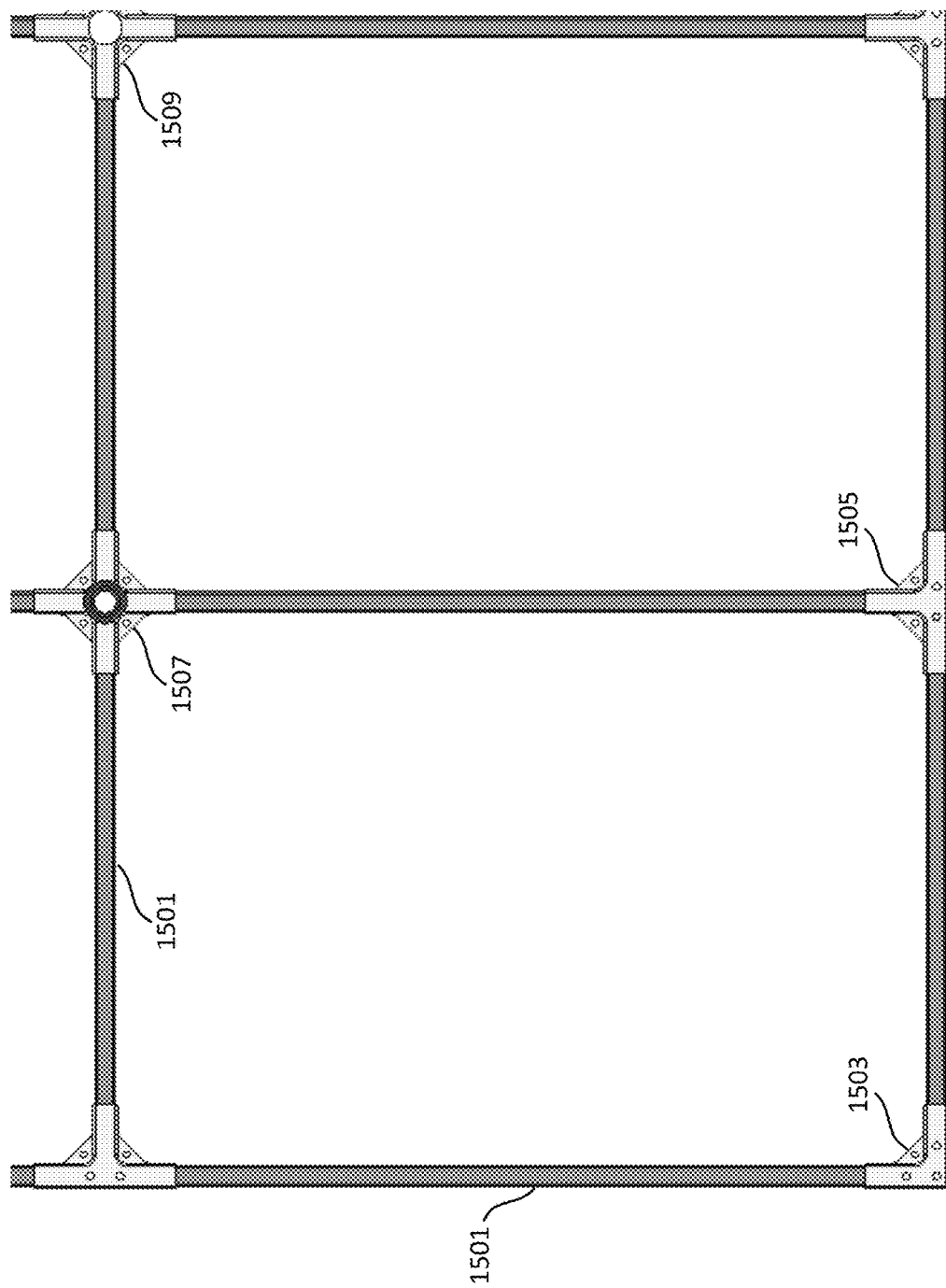
FIG. 15 illustrates an embodiment for the mechanical design of a frame structure that can be used in a modular structure for a solar array.

FIG. 15 illustrates an embodiment for the mechanical design of a frame structure that can be used in a modular structure for a solar array. A number of tubes 1501, such as of pultruded graphite, of the same cross-section can be made or ordered in bulk and cut to length and connected by nodes (1503, 1505, 1507, 1509), allowing sections to be readily added or removed if the requirements for the array change. More specifically, a number of tubes, two of which are marked out at 1501, connected by nodes similarly to the lugs of a lug and tube construction of a traditional bicycle frame. The tubes 1501 are assembled in to a frame type of structure by corner nodes 1503, T-shaped end nodes 1505, center nodes 1509, and center nodes with a hold-down insert 1507, where the nodes can have openings into which the tubes can be inserted, as illustrated in FIG. 17. This allows a frame structure that is minimalist in a repeatable assembly procedure and allows for late stage design changes by adding or removing bays to the array. Depending on the embodiment, the nodes can be carbon-loaded polyether ether ketone (PEEK), injection molded, titanium (3D printed or machined), or titanium with stainless steel inserts, for example. Center nodes can either be fitted with a hold-down insert. 1507 (see FIG. 17 for additional detail), or left open 1509. The size of the individual frames are based on the size of the bays, as illustrated in FIG. 16.

Figure 16:
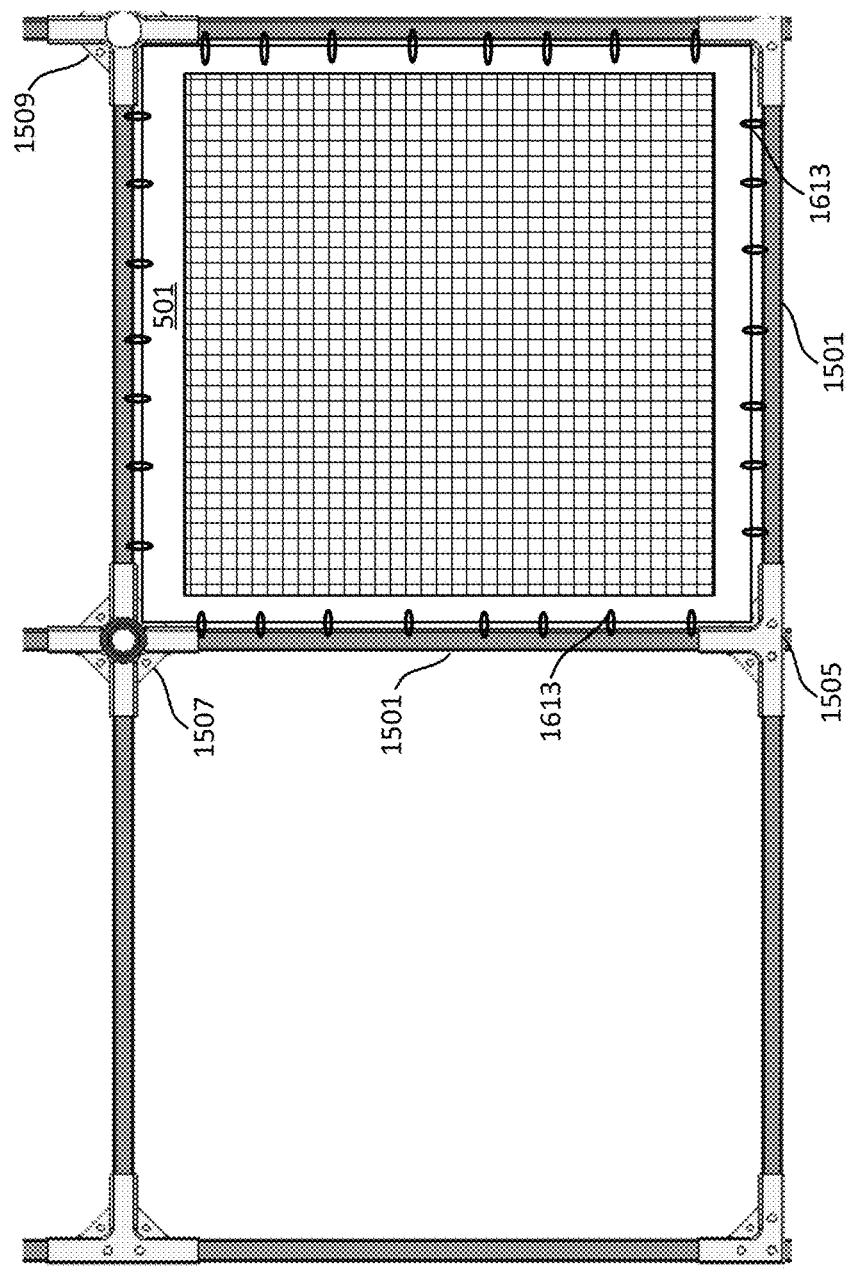
FIG. 16 repeats a portion of the frame structure with a bay attached in one of the frames.
Figure 17:
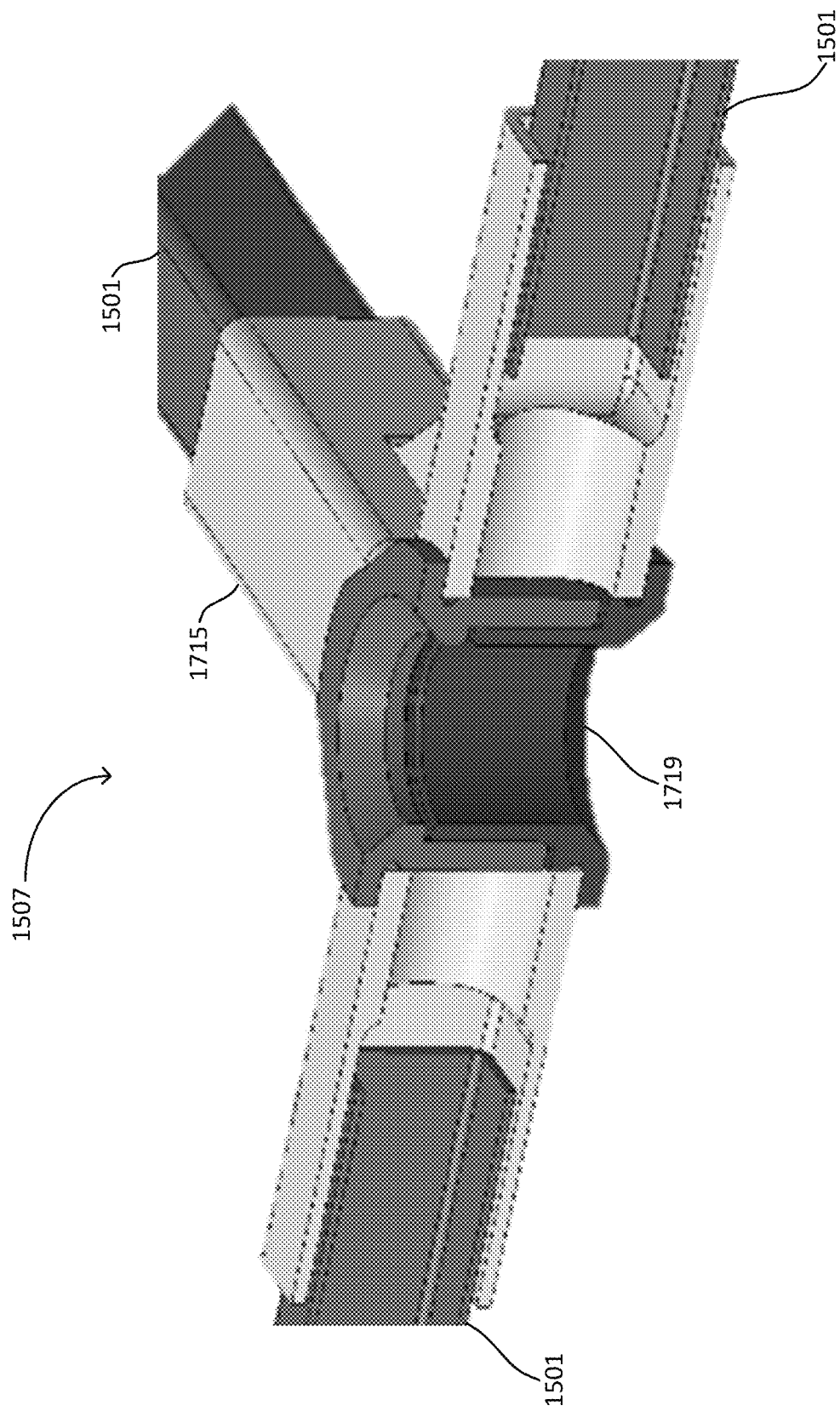
FIG. 17 illustrates an embodiment for a center node with hold-down insert in a section view.

FIG. 16 repeats a portion of the frame structure with a bay attached in one of the frames. In the embodiment of FIG. 16, the bay 501 can be as described above and the tubes 1501 are sized to hold the bay 501 in frames as held together by the nodes 1503, 1505, 1507, and 1509, where the nodes selected for a given frame depends on its location within a multi-frame panel, as 1201 or 1301. The bay 501 can be held in place by fasteners 1613 connecting them to the frame members 1501 and, in some embodiment, additionally or alternately to the nodes. A number of embodiments for the fasteners 1613 are possible, such as rivets, sewing of the bay to the frame, eyelets, straps, or various mechanical connectors. By using detachable connectors for the fasteners 1613, the individual bays 501 can be replaced if defective or for a different bay design (e.g., with an updated photovoltaic cell design), where the old bay can be detached mechanically and disconnected from the wiring harness and the replacement bay snapped back in its place. The replacement can be performed prior to launch or as part of an on-orbit servicing operation. This sort of modular structure of nodes connecting tubes to form frames that hold the bays also allows for rapid design changes as bays and frames can be added or removed by changing node types and adding or removing tubes and bays.

FIG. 17 illustrates an embodiment for a center node with hold-down insert 1507 in more detail. More specifically, FIG. 17 shows a section view with the center node 1507 cut laterally through its center along two of the tubes 1501, that have a rectangular shape in this embodiment, with an additional tube 1501 extending to the rear of the figure. The shown embodiment for the center node with hold-down insert 1507 includes a node portion 1715 with opening into which tubes 1501 to planarly connect four tubes 1501. The node portion 1715 also includes a central opening oriented orthogonally to the plane for tubes into which a hold-down can be inserted when the array is in a stowed configuration. In this embodiment the opening has a hold-down insert 1719 of an upper and a lower piece pressed together to form a bushing type element for holding of a hold-down. The hold down insert 1719 can be of a different material than the node portion 1715 so that, for example, it can protect the node portion or more easily allow the hold down to be released.

The common elements and simple geometry of the picture frame nodes allows for the solar array's design to be customized to the shape when in the stowed configuration and power requirements spacecraft when deployed. An automated process can used to determine the design based upon these requirements to optimize the structure for strength and mass and need not be limited to the usual rectangular or planar structures. For example, for satellites with non-rectangular body surfaces (e.g., hexagonal), the panel shapes can optimized to constraints of the satellite shapes. In some embodiments, the array structure of frame elements formed of tubes and nodes sized to fit the bays can be optimized by performing a quantitative optimization of an objective function corresponding to a figure of merit of the design. The quantitative optimization can include: generating a finite element analysis model, the analysis model a 3-D lattice mesh of strut-like finite elements; computing, with the finite element analysis model, a value for the objective function; and optimizing the objective function by executing cycles of an optimization loop. The optimization loop can include: computing a respective parameter of each strut-like finite element; deleting, from the finite element analysis model, selected finite elements for which a resulting mechanical property is less than a threshold; computing an updated value for the objective function; and repeating the optimization loop until the objective function is within a desired tolerance of the specified value. In some embodiments, the optimization can include determining a total surface area of the array with respect to any expected off-pointing of the spacecraft and/or seasonal variations in sun position, such as a curved, faceted wing surface for which at least some portion of the array will be normal to the sun without the need for dual-axis articulation of the wing. In some embodiments, an approach such as presented in U.S. Pat. No. 10,112,731, which is hereby incorporated by reference in its entirety, can be used.

Figure 18:
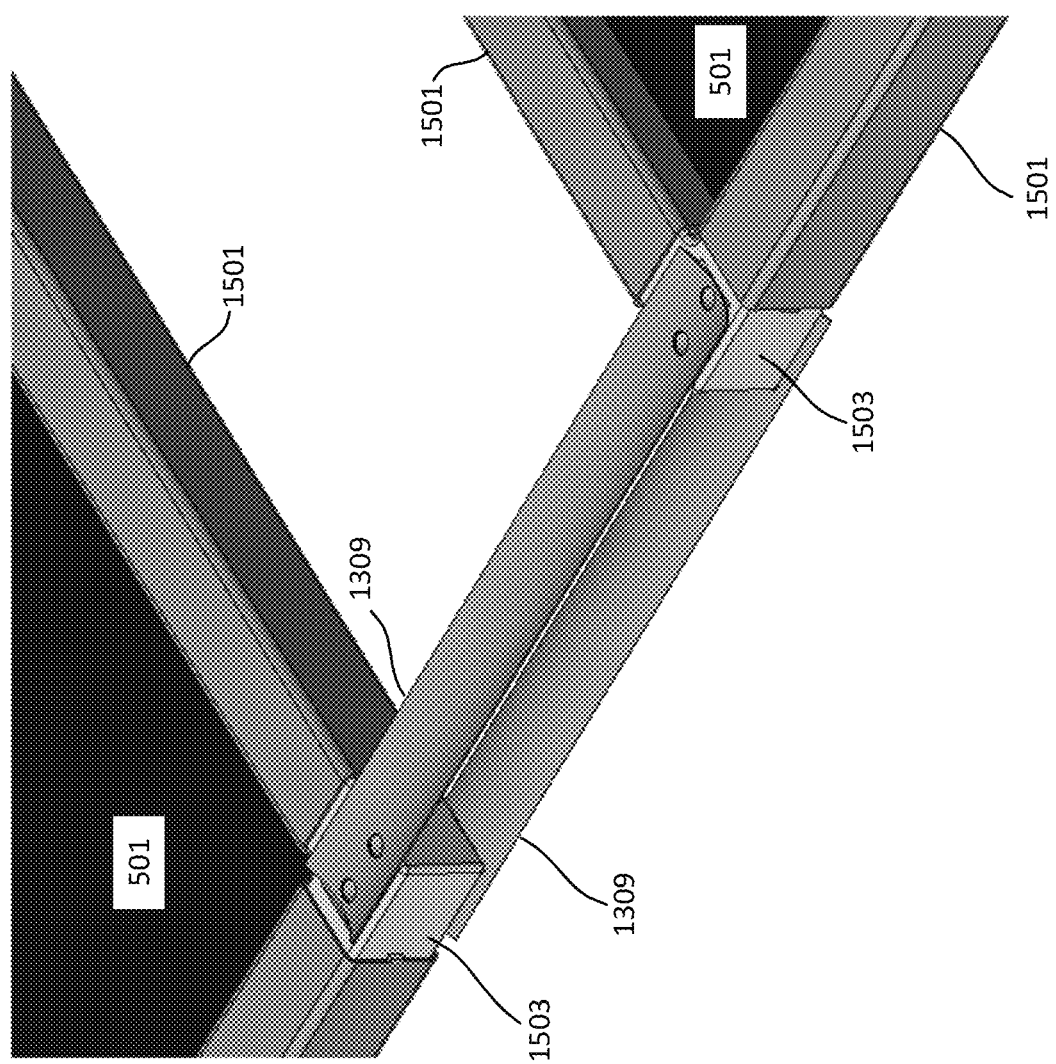
FIGS. 18-22 provide more detail on an embodiment for the hinge structure.

FIGS. 18-22 provide more detail on an embodiment for a mechanical design for the hinge structure 1309. FIG. 18 shows a portion of two panels in a deployed configuration, with a corner node 1503 connected to a pair of tubes 1501 framing a bay 501 from each panel. The corner nodes 1503 are connected by a pair of steel lenticular springs hinges 1309. The set of hinges 1309 can have a lenticular shape, similar to a tape measure, extending straight between the end nodes 1503, by having a curved in an arc in the transverse direction with their concave sides facing away from one another. Each hinge line with a pair of hinges: for example, refereeing back to FIG. 13, adjacent pairs of panels connected by four pairs of hinges, where an outer pair between the inner most two panels is marked at 1309.

Figure 19:
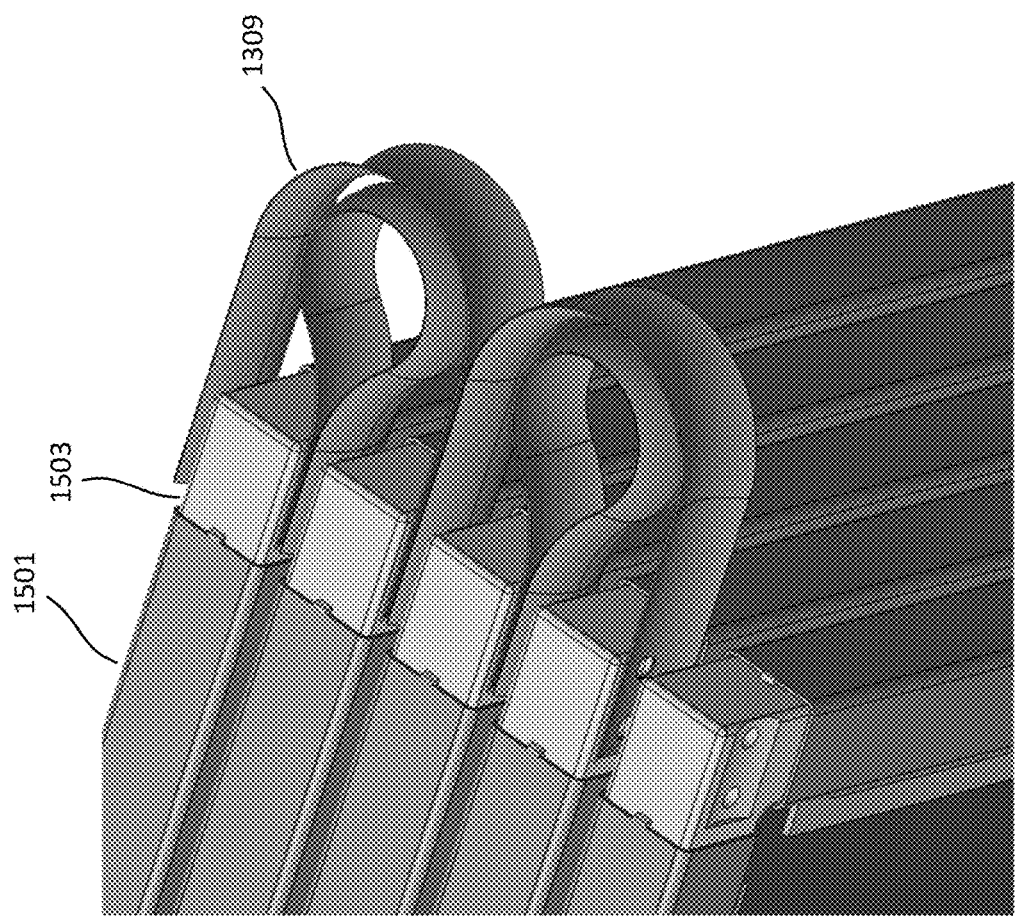

FIG. 19 shows a tube 1501 and corner node 1503 from each of five panels when in a stowed configuration, similar to seen in the side view of FIG. 14 but viewed obliquely from above. Between panels that are adjacent when deployed (e.g., the upper-most number panel and the panel next to it), a pair of hinges 1309 for each hinge line are shown folded back on themselves. The springs 1309 can be sized to meet torque margin, deployed strength/frequency requirements, and to fit stowed packaging.

Figure 20:
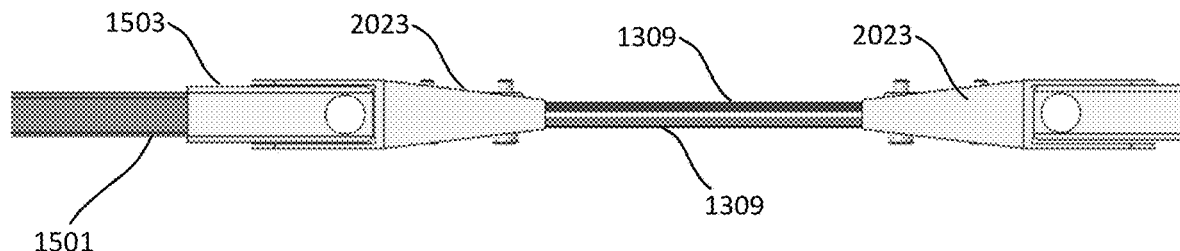
Figure 21:
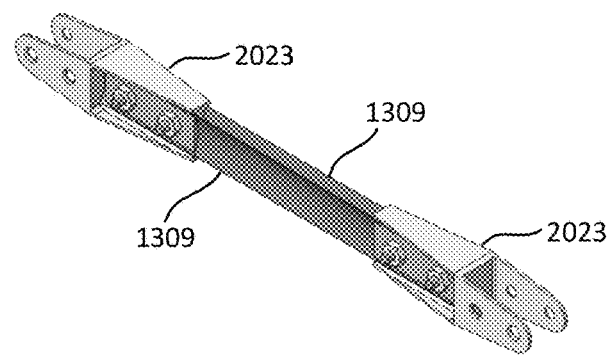
Figure 22:
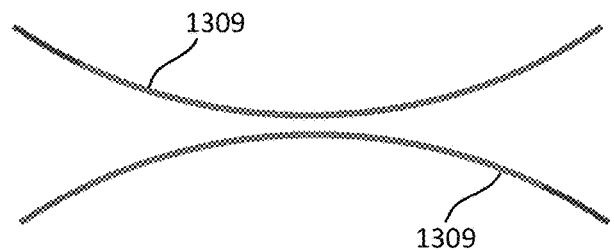

FIGS. 20 and 21 are a side and an oblique view of an embodiment for the hinges using hinge brackets. FIG. 21 shows a pair of end nodes 1503, one each from a pair of adjacent panels, with a tube 1501 connected to the end node shown to the left. In this embodiment, the pair of lenticular hinges 1309 have their convex sides facing each other and are connected on either side to a bracket 2023 by a pair of bolts and nuts, with each of the brackets 2023 bolted to a corresponding end node 1503. FIG. 21 shows the hinges 1309 bolted to the hinge brackets 2023 from a rotated oblique view. FIG. 22 is a cross-sectional view taken through the lenticular hinge 1309 pair to illustrate the curvature and the concave outward arrangement.

Figure 23:
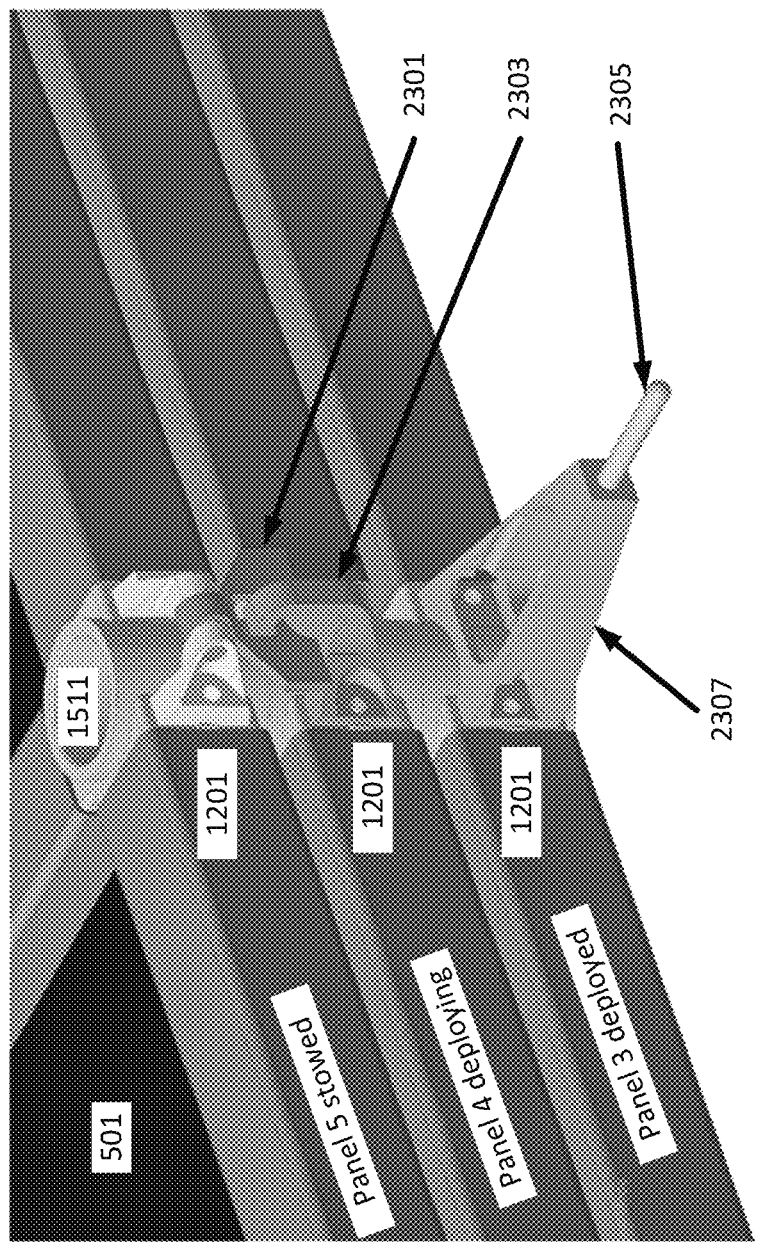
FIG. 23 illustrates some details of an embodiment for some of the mechanical elements for use in deployment sequencing.

FIG. 23 illustrates some details of one embodiment for some of the mechanical elements of a release mechanism for use in deployment sequencing. Referring back to embodiment of FIGS. 13 and 14, these respectively illustrate an embodiment for a solar array 1301 in its deployed configuration and the same array in its deployed configuration as mounted on a spacecraft 10. The stowed array is held in place by hold-downs 1431 or snubbers that are released to deploy the solar array 1301 as the hinges 1309 straighten. In one embodiment, the panels can deploy one at a time from inboard to outboard. FIG. 23 illustrates a mechanical sequencing mechanism such that each adjacent panel is locked to each other until full deployment on one panel unlocks the next panel in the sequence.

Figure illustrates the three outer-most panels 1201 at the point where panel 3 (along with unseen panels 1 and 2) have deployed, panel 4 is deploying, and panel 5 is still stowed. A T-shaped end node with a hold-down insert 1511 is connected to three tubes of each of the panels. Panel 3 has an asymmetric bracket 2307 with a release pin 2305. A restraint arm 2303 holds panel 5 in its stowed position against panel 4. As panel 4 deploys, the lenticular springs connecting it to panel 3 will rotate panel 4 toward panel 3 until the restraint arm 2303 engages with the asymmetric bracket, locking panel 4 in the deployed position, and the release pin 2305 hits the trigger plate 2301, releasing panel 5 to begin deploying.

Figure 24:
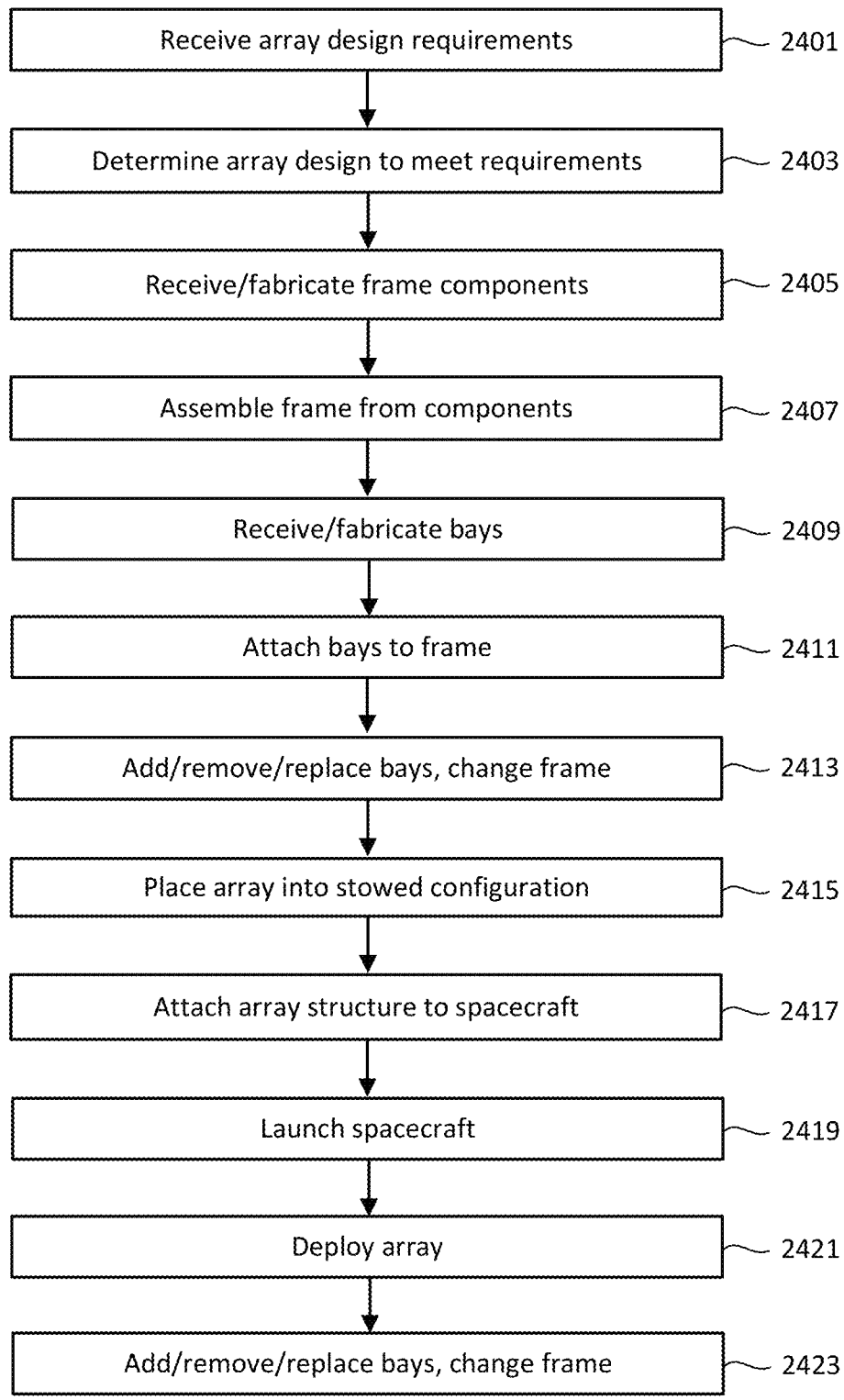
FIG. 24 is a flowchart for an embodiment to form a solar array.

FIG. 24 is a flowchart for an embodiment to form a solar array. Beginning at step 2401, a set of requirements for a solar array is generated or received. This can include the specification of things such as the power requirements of the satellite or spacecraft 10, details on the body of satellite or spacecraft such as the shape and dimensions of the portion of the body 261 that the solar array in its stowed configuration should fit, and the size of the substrate 503 and power supply capability of the solar array bays 501. Although the bays discussed so far have been rectangular in shape, in alternate embodiments these could have more general shapes, such as triangular or hexagonal. Based on the requirements, a design for the solar array can be generate at step 2403 specifying the number of panels, number of bays in each of the panels, and the arrangement of the bays in the panels. The design can be generated through an automated process, a manual process, or a combination of these. For example, a quantitative optimization using a finite element analysis.

At step 2405 the frame members' tubes (1501) and nodes (1503, 1505, 1507, 1509, 1511) for the design are received or fabricated. For example, the tubes 1501 can be of pultruded graphite sized to form the frames for the bays 501. The number and type of the nodes will depend on the design and can be formed of carbon-loaded polyether ether ketone (PEEK), injection molded, titanium (3D printed or machined), or titanium with stainless steel inserts, for example. The frame is then assembled at step 2407. At step 2409 the bays 501 are received or fabricated, where step 2409 can be before or after any of steps 2401, 2403, 2405, and 2407. At step 2411 the bays 501 are then attached to the frame as illustrated in FIG. 16 using fasteners 1613, such as rivets, sewing of the bay the frame, eyelets, straps, or various mechanical connectors. The modular construction of the solar array allows for defective bays to be replaced or, due to design changes in the frame, be removed or added at step 2413. The solar array can be placed into a stowed configuration at step 2415 and mounted onto the spacecraft body 261 at step 2417, where, depending on the embodiment, the solar array can be attached to the spacecraft body 261 before being fully assembled and put into a stowed configuration. The satellite or other spacecraft 10 can then be launched at step 2419, after which the solar array can be deployed at step 2421. The modular construction of the solar array also allows for defective bays to be replaced or, due to design changes in the frame, be removed or added after deployment at step 2423.

One set of embodiments include an apparatus including a solar array foldable in a first direction into a stowed configuration and comprising a plurality of tubes; a plurality of nodes each configured to connect to two or more of the tubes to connect the tubes into a plurality of panels each having a plurality of frames of a common size; and a plurality of hinges connecting the panels and configured to extend the panels in the first direction from the stowed configure into a deployed configuration. The solar array also includes a plurality of bays, each comprising a substrate shaped to fit within the frames, all of the substrates being of a common size and a plurality of strings of photovoltaic cells mounted on the substrate; a plurality of fasteners configured to detachably connect the bays into the frames; a yoke connected to a first of the panels and configured to mount the solar array to a body of a spacecraft; and a wiring harness detachably connectable to the bays and the spacecraft and configured to provide power from the strings of photovoltaic cells to the spacecraft.

One set of embodiments include a method comprising: receive a set of requirements for a solar array for a spacecraft, the set of requirements including a power requirement for the spacecraft, a shape and dimensions of a portion of a body of the spacecraft within which the solar array is to fit when in a stowed configuration, and a size and power supply capability of a plurality of bays each comprising a plurality of strings of photovoltaic cells mounted on a substrate, the substrate of each of the bays having a common size and the string of photovoltaic of each of the bays having a common power supply capability. The method also includes: determine a design for the solar array from the set of requirements, the design specifying a number and shape of a plurality of panels, each of the panels having a plurality of frames of a common size configured to hold one of the bays; receiving a plurality of tubes having a common cross-sectional shape; receiving a plurality of nodes each configured to connect to two or more of the tubes; connecting the tubes with the nodes to form the panels according to the determined design; detachably connect one of the bays into each of the frames; connect the panels with a plurality of hinges configured to extend the panels from the stowed configure into a deployed configuration; and detachably connect the bays with a wiring harness configured to provide power from the strings of photovoltaic cells to the spacecraft.

One set of embodiments include a spacecraft comprising: a spacecraft body and a solar array foldable in a first direction into a stowed configuration. The solar array comprises: a plurality of tubes; a plurality of nodes each configured to connect to two or more of the tubes to connect the tubes into a plurality of panels each having a plurality of frames of a common size, a plurality of the nodes including a hold-down insertion opening; a plurality of hinges connecting the panels and configured to extend the panels in the first direction from the stowed configure into a deployed configuration; a plurality of bays, each comprising a substrate shaped to fit within the frames, all of the substrates being of a common size, and a plurality of strings of photovoltaic cells mounted on the substrate; a plurality of fasteners configured to detachably connect the bays into the frames; a yoke connected to a first of the panels and configured to mount the solar array to a body of a spacecraft; and a wiring harness detachably connectable to the bays and the spacecraft and configured to provide power from the strings of photovoltaic cells to the spacecraft. The spacecraft also includes a plurality of releasable hold-downs fit into the hold-down insertion openings to hold the solar array in the stowed configuration.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method, comprising:
receiving a set of requirements for a solar array for a spacecraft, the set of requirements including:
 a power requirement for the spacecraft;
 a shape and dimensions of a portion of a body of the spacecraft within which the solar array is to fit when mounted on the body in a stowed configuration; and
 a size and power supply capability of a plurality of bays each comprising a plurality of strings of photovoltaic cells mounted on a substrate, the substrate of each of the bays having one of one or more shared sizes and the string of photovoltaic of each of the bays having a shared power supply capability;
determining a design for the solar array from the set of requirements, the design specifying a number and shape of a plurality of panels, each of the panels having a plurality of frames of one or more shared size configured to hold one of the bays;
receiving a plurality of tubes having a shared cross-sectional shape;
receiving a plurality of nodes each configured to connect to two or more of the tubes, a plurality of the nodes including a releasable hold-down insertion opening;
connecting the tubes with the nodes to form the panels according to the determined design, each of the panels including one or more of the nodes including a releasable hold-down insertion opening;
detachably connecting one of the bays into each of the frames;
connecting the panels with a plurality of hinges configured to extend the panels from the stowed configure into a deployed configuration;
detachably connecting the bays with a wiring harness configured to provide power from the strings of photovoltaic cells to the spacecraft; and
subsequent to detachably connecting one of the bays into each of the frames, connecting the panels with the plurality of hinges, and detachably connecting the bays with the wiring harness, folding the panels at the hinges to place the solar array into the stowed configuration, including configuring the panels to allow insertion of a plurality of releasable hold-downs extending through all of the plurality of panels.

2. The method claim 1, further comprising:
subsequent to detachably connecting one of the bays into each of the frames and detachably connecting the bays with the wiring harness, determining that a first of the bays is defective;
detaching the first bay from the frame into which the first bay is connected;
detaching the first bay from the wiring harness; and
subsequent to detaching the first bay from the frame into which the first bay is connected and from the wiring harness, replace the first bay with a second bay by attaching the second bay to the frame into which the first bay was connected and to the wiring harness.

3. The method of claim 1, further comprising:
subsequent to detachably connecting one of the bays into each of the frames and detachably connecting the bays with the wiring harness, receiving a revised set of requirements;
updating the design from the revised set of requirements; and
altering the panels and bay connections according to the updated design.

4. The method of claim 1, further comprising:
subsequent to configuring the panels to allow insertion of a plurality of hold-downs extending through all of the plurality of panels, inserting the plurality of releasable hold-downs into a plurality hold-down insertion openings in the nodes configured to hold the solar array in the stowed configuration.

5. The method of claim 4, further comprising:
attaching the solar array to the spacecraft;
launching the spacecraft with the attached solar array in the stowed configuration;
subsequent to launching the spacecraft, deploying the solar array;
determining that a first of the bays of the deployed solar array is defective;
detaching the first bay from the frame into which the first bay is connected;

detaching the first bay from the wiring harness; and subsequent to detaching the first bay from the frame into which the first bay is connected and from the wiring harness, replace the first bay with a second bay by attaching the second bay to the frame into which the first bay was connected and to the wiring harness.

6. The method claim 1, wherein each of the hinges connecting one or more of the panels comprise a pair of lenticular springs.

7. The method of claim 1, wherein each of one or more of the plurality of bays comprise multiple strings of solar array cells mounted on semi-rigid face-sheet structural elements.

8. The method of claim 1, wherein the bays are connected into each of the frames using detachable mechanical connectors.

9. The method of claim 8, wherein the detachable mechanical connectors are rivets.

10. The method of claim 1, wherein detachably connecting one of the bays into each of the frames comprises:

sewing the bays into a corresponding frame.

11. The method claim 1, wherein the nodes are formed of carbon-loaded polyether ether ketone.

12. The method claim 1, wherein the nodes are formed injection molding.

13. The method claim 1, wherein the nodes are formed of titanium.

14. The method claim 1, wherein the nodes are formed of titanium with stainless steel inserts.

15. The method claim 1, wherein all of the tubes are formed with a shared cross-sectional shape.

16. The method claim 1, wherein the tubes are formed of pultruded graphite.

* * * * *